(12) United States Patent
Amidon et al.

(10) Patent No.: US 9,122,645 B1
(45) Date of Patent: Sep. 1, 2015

(54) METHOD AND SYSTEM FOR TAGGING WITHIN VIRTUAL GROUPS

(75) Inventors: Christopher M. Amidon, Apex, NC (US); Cheryl Adams, Cary, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2750 days.

(21) Appl. No.: 11/613,396

(22) Filed: Dec. 20, 2006

(51) Int. Cl.
| | |
|---|---|
| G06F 15/16 | (2006.01) |
| G06F 15/173 | (2006.01) |
| G06F 15/76 | (2006.01) |
| G06F 12/00 | (2006.01) |
| H04L 12/46 | (2006.01) |
| G06Q 50/00 | (2012.01) |
| G06Q 10/10 | (2012.01) |
| G06Q 30/02 | (2012.01) |
| H04L 29/06 | (2006.01) |

(52) U.S. Cl.
CPC ............... *G06F 15/16* (2013.01); *G06Q 10/10* (2013.01); *G06Q 30/02* (2013.01); *G06Q 30/0241* (2013.01); *G06Q 30/0251* (2013.01); *G06Q 50/01* (2013.01); *H04L 12/4641* (2013.01); *H04L 12/4645* (2013.01); *H04L 12/4654* (2013.01); *H04L 63/0272* (2013.01)

(58) Field of Classification Search
USPC .................. 709/223, 224, 219, 229; 382/305
See application file for complete search history.

(56) References Cited

U.S. PATENT DOCUMENTS

| | | | |
|---|---|---|---|
| 5,241,671 A * | 8/1993 | Reed et al. .......................... 1/1 |
| 6,741,271 B1 | 5/2004 | McConica et al. | |
| 6,760,884 B1 | 7/2004 | Vertelney et al. | |
| 6,850,247 B1 | 2/2005 | Reid et al. | |
| 6,954,543 B2 | 10/2005 | Svendsen et al. | |
| 6,957,233 B1 | 10/2005 | Beezer et al. | |
| 7,032,182 B2 | 4/2006 | Prabhu et al. | |
| 2002/0093678 A1 | 7/2002 | Skidgel et al. | |
| 2002/0107829 A1 * | 8/2002 | Sigurjonsson et al. ........... 707/1 |
| 2003/0088582 A1 | 5/2003 | Pflug | |
| 2003/0117651 A1 * | 6/2003 | Matraszek et al. ........... 358/1.18 |
| 2004/0101212 A1 | 5/2004 | Fedorovskaya et al. | |
| 2004/0201692 A1 | 10/2004 | Parulski et al. | |
| 2005/0179942 A1 | 8/2005 | Stavely et al. | |

(Continued)

FOREIGN PATENT DOCUMENTS

| | | |
|---|---|---|
| WO | WO 02/057959 A2 | 7/2002 |
| WO | WO 02/057959 A3 | 7/2002 |

OTHER PUBLICATIONS

Flickr What is Flickr?, http://www.flickr.com/learn_more.gne, Feb. 19, 2007.

(Continued)

*Primary Examiner* — Ninos Donabed
*Assistant Examiner* — Farrukh Hussain
(74) *Attorney, Agent, or Firm* — Withrow & Terranova, PLLC

(57) ABSTRACT

A system and method are provided for tagging images or albums shared by a group of users. More specifically, a virtual group is defined, where each user in the virtual group has an associated image collection. The image collection of each user, or a select portion thereof, is made available to the other users in the virtual group. A number of group tags forming a tag vocabulary are defined for the virtual group, and the users in the virtual group are enabled to tag their own images, images shared by other users in the virtual group, or both using the group tags. Using the group tags, the images shared within the virtual group can be efficiently sorted, searched, and organized. Permissions may be defined to control access to and visibility of the group tags.

25 Claims, 10 Drawing Sheets

(56) References Cited

U.S. PATENT DOCUMENTS

| | | |
|---|---|---|
| 2005/0190273 A1 | 9/2005 | Toyama et al. |
| 2008/0032739 A1* | 2/2008 | Hoodbhoy et al. ......... 455/556.2 |
| 2009/0077084 A1* | 3/2009 | Svendsen ............................ 707/9 |
| 2009/0100096 A1* | 4/2009 | Erlichson et al. ........... 707/104.1 |

OTHER PUBLICATIONS

Flickr Here are some features . . . , http://www.flickr.com/learn_more_2.gne, Feb. 19, 2007.

Flickr Notes and Tags, http://www.flickr.com/learn_more_3.gne, Feb. 19, 2007.

Flickr Friends Family and Groups, http://www.flickr.com/learn_more_4.gne, Feb. 19, 2007.

Flickr Organize with Organizr!, http://www.flickr.com/learn_more_5.gne, Feb. 19, 2007.

Flickr Great shot, http://www.flickr.com/learn_more_6.gne, Feb. 19, 2007.

Flickr Gosh, could there possibly be more?, http://www.flickr.com/learn_more_7.gne, Feb. 19, 2007.

Simpy, http://www.simpy.com/, Feb. 20, 2007.

\* cited by examiner

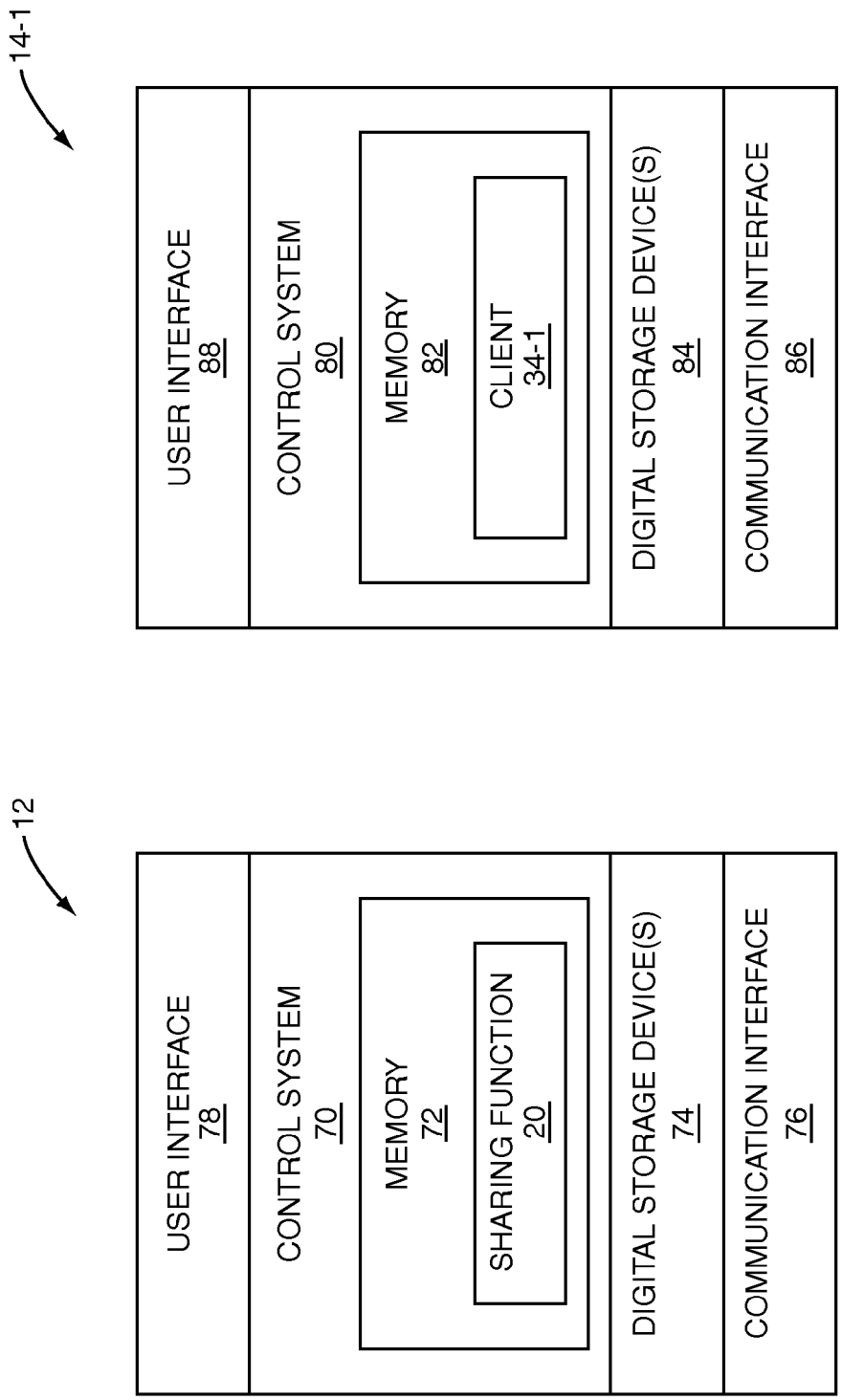

METHOD AND SYSTEM FOR TAGGING WITHIN VIRTUAL GROUPS

FIELD OF THE INVENTION

The present invention relates to tagging of digital media files such as digital images.

BACKGROUND OF THE INVENTION

"Tagging" is a process that enables a user to associate keywords or phrases ("tags") with a digital media file such as a digital image. The tags are generally keywords or phrases that are descriptive of the content of the digital image. For example, a user may apply the tags "1st B-Day" and "Garrett" to a digital image, or digital picture, of the user's child at the child's first birthday party. Once the images in an image collection are tagged, the user may then search the image collection for desired images based on the tags.

One issue with traditional tagging is that no two users have the same tagging vocabulary. For example, if two family members take pictures at a family gathering on Christmas, one of the family members may apply tags such as "Christmas" and "Andrew" to his images while the other family member may apply the tag "X-Mas" and "Andy" to her images. As a result of varying tagging vocabularies, when users share images using any of the popular photo-sharing services, the shared images cannot be easily searched based on tags. Thus, there is a need for a system and method for tagging images with group level tags such that images shared among members of a group can easily be searched using a single tagging vocabulary.

SUMMARY OF THE INVENTION

The present invention relates to a system and method for tagging images or albums shared within a virtual group by an associated group of users. More specifically, a virtual group is defined, where each user in the virtual group has an associated image collection. The image collection of each user, or a select portion thereof, is made available to the other users in the virtual group. In addition, a number of group tags forming a tag vocabulary are defined for the virtual group. The group tags may be defined by one or more users in the virtual group, automatically determined based on an analysis of existing tags applied to the images or albums shared within the virtual group by their owners, or both. Thereafter, the users in the virtual group are enabled to tag their own images, images shared by other users in the virtual group, or both using the group tags. Using the group tags, the images or albums shared within the virtual group can be efficiently sorted, searched, and organized. Permissions may be defined to control access to and visibility of the group tags.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 11 is a block diagram of an exemplary embodiment of the central server of FIG. 1 according to one embodiment of the present invention; and FIG. 12 is a block diagram of an exemplary embodiment of one of the user devices of FIG. 1 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
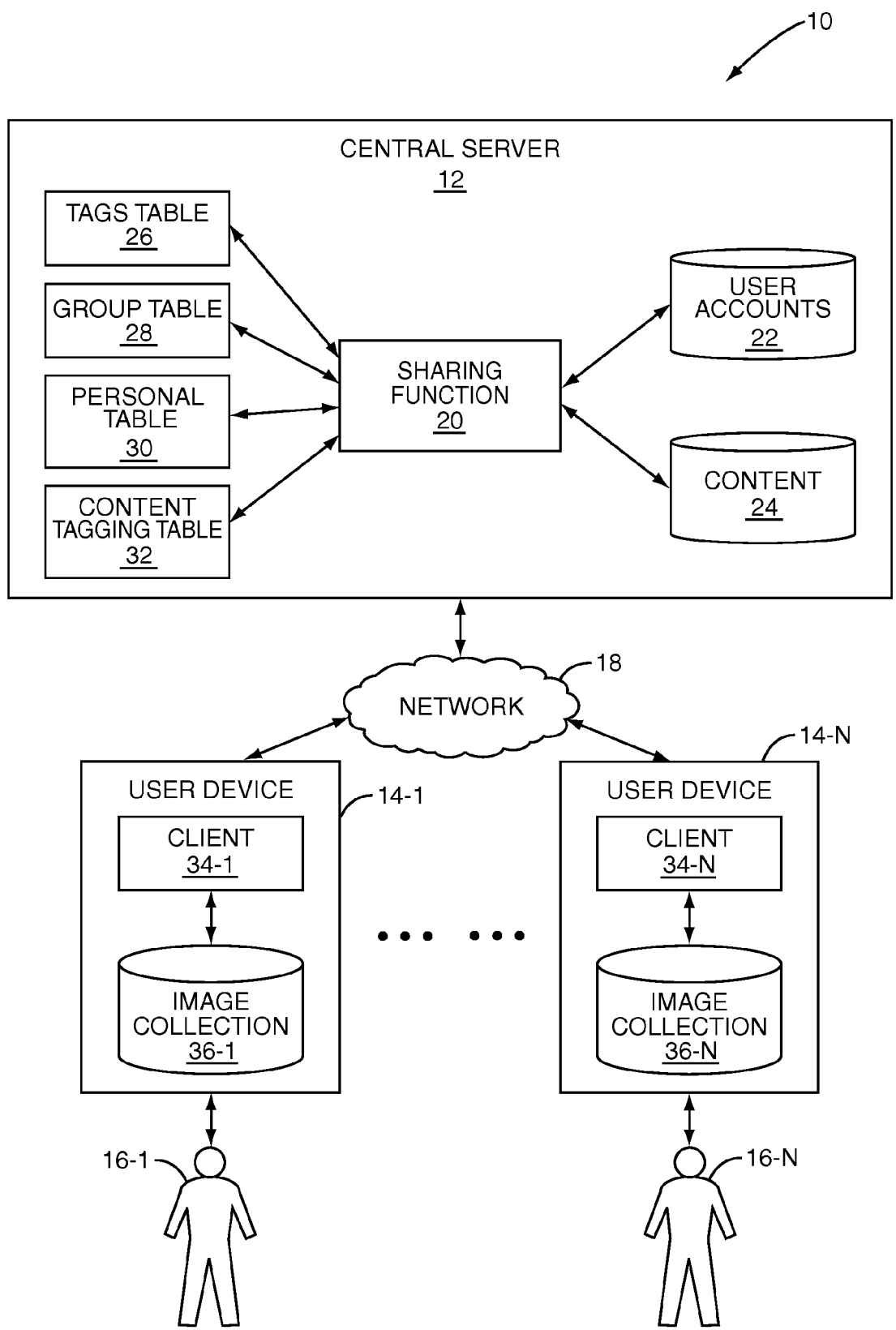
FIG. 1 illustrates an exemplary photo-sharing system incorporating the present invention.

FIG. 1 illustrates a centrally hosted photo-sharing system 10 enabling tagging of images or albums shared within virtual groups using group tags according to one embodiment of the present invention. "Tagging" is a process that enables a user to associate keywords or phrases ("tags") with a digital media file such as a digital image. The tags are generally keywords or phrases that are descriptive of the content of the digital image. It should be noted that while the discussion herein focuses on the centrally hosted photo-sharing system 10, the present invention is not limited thereto. The present invention is equally applicable to other types of digital media sharing systems such as, for example, a Peer-to-Peer (P2P) photo-sharing system, a hybrid P2P photo-sharing system, and the like. Further, while the discussion herein focuses on digital images or photos, the present invention is equally applicable to other types of digital media files such as video and audio files.

In general, the system 10 includes a central server 12 and a number of user devices 14-1 through 14-N having associated users 16-1 through 16-N, where the central server 12 and the user devices 14-1 through 14-N are connected via a network 18. The network 18 may be a Wide Area Network (WAN), Local Area Network (LAN), or the like and may be formed by wired components, wireless components, or a combination of wired and wireless components. For example, the network 18 may be the Internet.

The central server 12 includes a sharing function 20, a user accounts database 22, a content database 24, and a number of tagging tables 26-32. Note that while the central server 12 is shown as a single server, it may alternatively be a number of servers operating in a collaborative fashion for purposes of load sharing and redundancy. The sharing function 20 is preferably implemented in software. However, the present invention is not limited thereto. As discussed below in more detail, the sharing function 20 enables the formation of virtual groups and tagging of images or albums shared within the virtual groups with group tags and optionally personal tags. As used herein, a virtual group is not a separate image collection but rather an association of users and/or other virtual groups. Further, the images or albums shared within the virtual group may be all images or albums uploaded to the central server 12 by the users in the virtual group. Alternatively, the users in the virtual group may, for example, select desired images or albums from their collections to share within the virtual group or implicitly share images or albums within the virtual group by tagging images or albums with one or more group tags of the virtual group. The sharing function 20 may also provide various other photo-sharing functions, as will be apparent to one of ordinary skill in the art.

The users accounts database 22 stores a user account for each of the users 16-1 through 16-N. Using the user 16-1 as an example, the user account of the user 16-1 may include information such as, for example, the name or a username of the user 16-1, the e-mail address of the user 16-1, demographic information describing the user 16-1, and the like. In addition, the user account of the user 16-1 includes references to or information otherwise identifying images or albums uploaded to the central server 12 by the user 16-1 and stored in the content database 24. Note that in an alternative embodiment, the images or albums shared by the user 16-1 may not be uploaded to the central server 12 and the user account may include references to or information otherwise identifying the images or albums shared by the user 16-1 hosted at the user device 14-1.

The content database 24 operates to store images or albums shared by the users 16-1 through 16-N, which have been uploaded to the central server 12 from the user devices 14-1 through 14-N. Using the user 16-1 as an example, the images uploaded to the central server 12 and stored in the content database 24 are referred to collectively as the uploaded image collection of the user 16-1. Again, note that in an alternative embodiment, the images or albums shared by the users 16-1 through 16-N may not be uploaded to the central server 12 and may be obtained by the central server 12 or the other user devices 14-1 through 14-N as desired.

The tagging tables 26 through 32 include a tags table 26, a group table 28, a personal table 30, and a content tagging table 32. Note that while that the tagging tables 26-32 are illustrated as separate tables for clarity and ease of discussion, the present invention is not limited thereto. For example, the tagging tables 26-32 may be implemented as a single table.

The tags table 26 stores a tag entry for each tag used by the system 10. The tags include group tags and, optionally, personal tags. As discussed below, group tags are tags defined and used by users in a virtual group to tag images shared within the virtual group. The group tags form a common tag vocabulary for the members of the virtual group, and may be used by the members of the virtual group to consistently tag images shared within the virtual group and efficiently sort, search, and organize the images shared within the virtual group. Personal tags are tags defined by a user and used to tag images shared within the virtual group. Generally, the personal tags are only visible to the associated user and optionally the owners of the associated images if they differ. The personal tags enable, for example, the user 16-1 to apply personal tags to images shared by other users such as the user 16-N within a virtual group of the user 16-1. The personal tags of the user 16-1 enable the user 16-1 to sort, search, and organize the images shared within the virtual group using the user's own personal tags in addition to or as an alternative to the group tags for the virtual group. Note that the use of personal tags is not limited to a virtual group. Rather, personal tags may be used to tag any image or album to which the associated user has access.

Each tag entry in the tags table 26 includes the tag itself. In addition, each tag entry may include information identifying a virtual group associated with the tag if the tag is a group tag or information identifying a user associated with the tag if the tag is a personal tag. In one embodiment, each tag entry may also include references to or information otherwise identifying images shared by the users 16-1 through 16-N that have been tagged with that particular tag.

The group table 28 stores a group entry for each virtual group. A group entry includes information identifying members of the virtual group, where the members may include one or more of the users 16-1 through 16-N and optionally one or more other virtual groups. In addition, the group entry includes references to one or more group tags stored in the tags table 26 defined for the virtual group. In addition, the group entry may include references to or information otherwise identifying images shared within the virtual group. The personal table 30 stores a personal entry for each of the users 16-1 through 16-N that has defined personal tags. A personal entry may include information identifying the associated user and references to one or more personal tags stored in the tags table 26 defined by the user.

The content tagging table 32 is optional and may store an entry for each image shared by the users 16-1 through 16-N. Each entry includes a reference to or information otherwise identifying an associated image in the content database 24. In addition, the entry includes references to one or more of the personal and/or group tags in the tags table 26 that have been used to tag the image.

Each of the user devices 14-1 through 14-N may be, for example, a personal computer, mobile telephone, Personal Digital Assistant (PDA), digital camera having a network interface, or the like. The user device 14-1 includes a client function 34-1 and an image collection 36-1. The client function 34-1 is preferably implemented in software. However, the present invention is not limited thereto. For example, the client function 34-1 may be a web browser enabling the user device 14-1 to interact with the sharing function 20 or a proprietary application. The image collection 36-1 includes a number of images owned by the user 16-1. For example, the image collection 36-1 may include a number of images transferred to the user device 14-1 from a digital camera owned by the user 16-1. The images in the image collection 36-1 may be organized into one or more photo albums, which are also referred to herein as albums. Likewise, the user device 14-N includes a client function 34-N and an image collection 36-N.

In operation, the users 16-1 through 16-N interact with the client functions 34-1 through 34-N to upload images to the central server 12 where the images are stored in the content database 24 and available for sharing. The uploaded images are referred to herein as the uploaded image collections of the users 16-1 through 16-N. Either before or after the images are uploaded to the central server 12, users 16-1 through 16-N may organize the images into one or more albums. More specifically, using the user 16-1 as an example, the user 16-1 may interact with the client function 34-1 to establish a user account at the central server 12. Either during this registration process or sometime thereafter, the user 16-1 may interact with the client function 34-1 to upload the image collection 36-1, or a select portion thereof, to the central server 12, where the uploaded images are stored in the content database 24 in association with the user account of the user 16-1. In a similar fashion, the other users, such as the user 16-N, register with the central server 12 and upload images to be shared to the central server 12, where the uploaded images are stored in association with the user accounts of the other users.

As discussed below in detail and again using the user 16-1 as an example, the user 16-1 may desire to share his images or a select portion thereof with one or more of the other users 16-2 through 16-N. As such, the user 16-1 may define a virtual group including himself and the one or more of the other users 16-2 through 16-N. As a result, when the user 16-1 logs into the central server 12, the sharing function 20 enables the user 16-1 to view both his own images and the images shared with the virtual group by the other users in the virtual group. In a similar fashion, when the other users in the virtual group log into the central server 12, the other users are enabled to view their own images as well as the images shared with the virtual group by the other users in the virtual group. Note that the users in the virtual group still maintain separate accounts and separate uploaded image collections. However, the sharing function 20 enables users within a virtual group to see the images shared within the virtual group.

The users in the virtual group may define group tags for the virtual group, modify existing group tags for the virtual group, and tag images shared within the virtual group with one or more of the group tags. Using the group tags, the users within the virtual group may efficiently sort, search, and organize the images shared within the virtual group. In a similar fashion, the user 16-1, for example, may define one or more personal tags and use the personal tags to tag both images shared by the user 16-1 and images shared by the other users in the virtual group. The user 16-1 may then use his personal tags in addition to or as an alternative to the group tags to sort, search, and organize the images shared within the virtual group.

Figure 2:
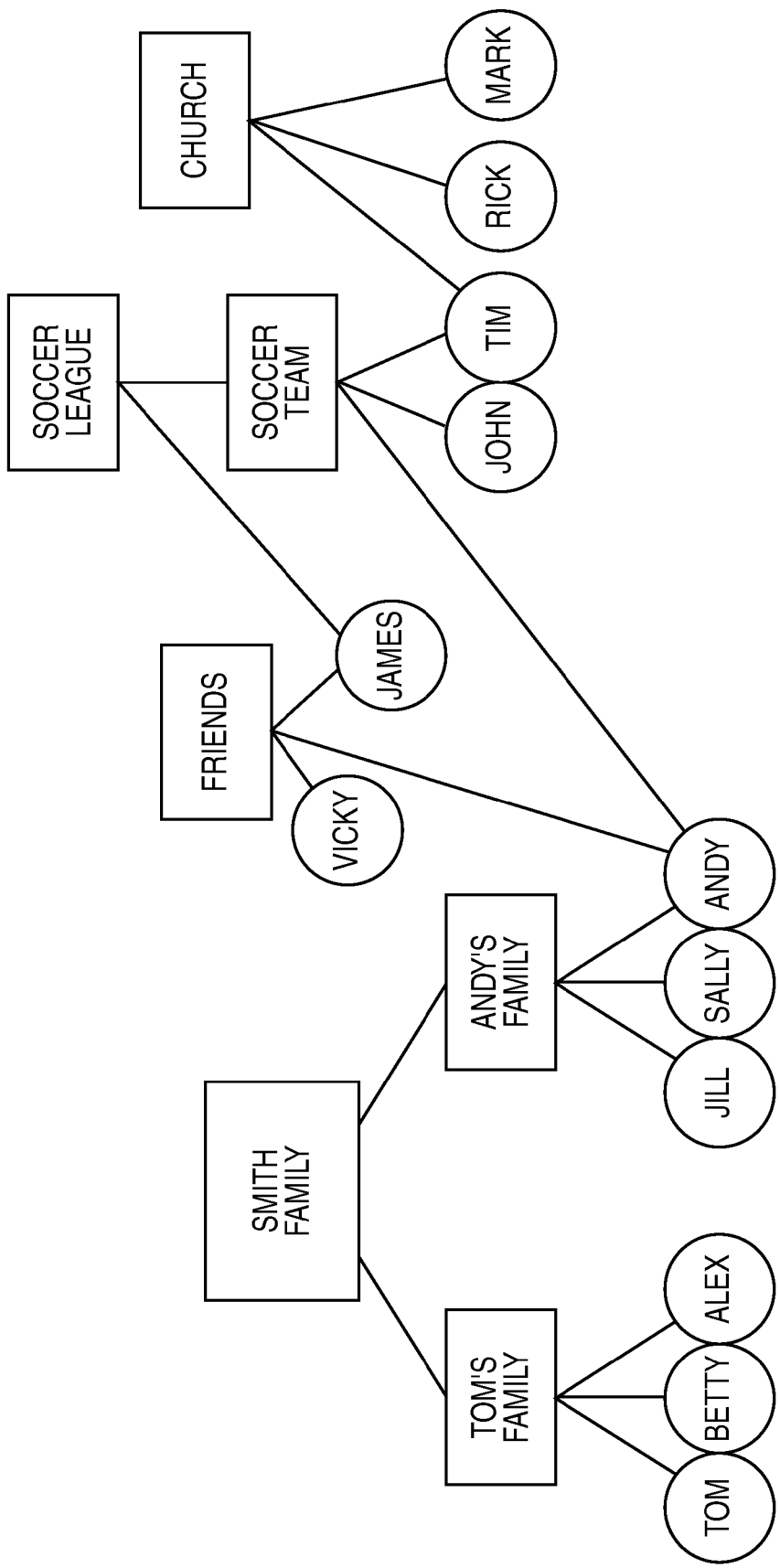
FIG. 2 is a diagram illustrating the concept of virtual groups according to one embodiment of the present invention.

FIG. 2 illustrates the concept of a virtual group according to an exemplary embodiment of the present invention. In this illustration, the rectangular boxes represent virtual groups and the circles represent ones of the users 16-1 through 16-N. From this example, it is shown that the members of a virtual group may be one or more of the users 16-1 through 16-N, other virtual groups, or both. Further, a single user may be a member of more than one virtual group. For example, the "Smith Family" virtual group has two members, the "Tom's Family" virtual group and the "Andy's Family" virtual group. The "Tom's Family" virtual group has three members, which are the users "Tom," "Betty," and "Alex." The "Andy's Family" virtual group has three members, which are the users "Andy," "Sally," and "Jill." The user "Andy" is also a member of the "Friends" virtual group and the "Soccer Team" virtual group. Also note that the "Soccer League" virtual group has two members, which are the user "James" and the "Soccer Team" virtual group.

When the user "Andy" logs into the central server 12, the sharing function 20 enables "Andy" to view images shared within the "Andy's Family" virtual group, the "Smith Family" virtual group, the "Friends" virtual group, and/or the "Soccer Team" virtual group. In one embodiment, the sharing function 20 enables "Andy" to select one of the virtual groups of which he is a member from which to operate. Assuming that "Andy" selects the "Friends" virtual group, the sharing function 20 enables "Andy" to view the images shared within the "Friends" virtual group. In other words, the sharing function 20 enables "Andy" to view the images shared with the "Friends" virtual group by both himself and the other members of the "Friends" virtual group, which in this example are the users "Vicky" and "James." Note that each of the users "Andy," "James," and "Vicky" may share all or a select portion of their uploaded image collections with the "Friends" virtual group. The sharing function 20 also enables "Andy" to view the group tags defined for the "Friends" virtual group, add group tags for the "Friends" virtual group, modify existing group tags for the "Friends" virtual group, or the like. In addition, the sharing function 20 enables "Andy" to tag his images that are shared with the "Friends" virtual group and/or images owned by other users shared within the "Friends" virtual group with one or more of the group tags for the "Friends" virtual group. "Andy" may also be permitted to modify or remove tags applied to images shared within the virtual group. The sharing function 20 may also enable "Andy" to sort the images shared within the "Friends" virtual group based on one or more of the group tags, search the images shared within the "Friends" virtual group based on one or more of the group tags for the "Friends" virtual group, or organize the images shared within the "Friends" virtual group based on the group tags for the "Friends" virtual group.

In a similar fashion, if "Andy" were to select the "Andy's Family" virtual group, the sharing function 20 would enable "Andy" to view images shared within the "Andy's Family" virtual group, which are the images shared with the "Andy's Family" virtual group by the users "Andy," "Sally," and "Jill." The sharing function 20 would also enable "Andy" to view the group tags defined for the "Andy's Family" virtual group, add group tags for the "Andy's Family" virtual group, modify existing group tags for the "Andy's Family" virtual group, or the like. In addition, the sharing function 20 enables "Andy" to tag his images that are shared with the "Andy's Family" virtual group and/or images owned by other users shared within the "Andy's Family" virtual group with one or more of the group tags for the "Andy's Family" virtual group. "Andy" may also be permitted to modify or remove tags applied to images shared within the virtual group. The sharing function 20 may also enable "Andy" to sort the images shared within the "Andy's Family" virtual group based on one or more of the group tags, search the images shared within the "Andy's Family" virtual group based on one or more of the group tags for the "Andy's Family" virtual group, or organize the images shared within the "Andy's Family" virtual group based on the group tags for the "Andy's Family" virtual group.

Still further, if "Andy" were to select the "Smith Family" virtual group, the sharing function 20 would enable "Andy" to view images shared within the "Smith Family" virtual group, which in this example, are images from the "Tom's Family" virtual group and the "Andy's Family" virtual group that are also shared with the "Smith Family" virtual group. The sharing function 20 would also enable "Andy" to view the group tags defined for the "Smith Family" virtual group, add group tags for the "Smith Family" virtual group, modify existing group tags for the "Smith Family" virtual group, or the like. In addition, the sharing function 20 enables "Andy" to tag his images that are shared with the "Smith Family" virtual group and/or images owned by other users shared within the "Smith Family" virtual group with one or more of the group tags for the "Smith Family" virtual group. "Andy" may also be permitted to modify or remove tags applied to images shared within the virtual group. The sharing function 20 may also enable "Andy" to sort the images shared within the "Smith Family" virtual group based on one or more of the group tags, search the images shared within the "Smith Family" virtual group based on one or more of the group tags for the "Smith Family" virtual group, or organize the images shared within the "Smith Family" virtual group based on the group tags for the "Smith Family" virtual group.

Figure 3:
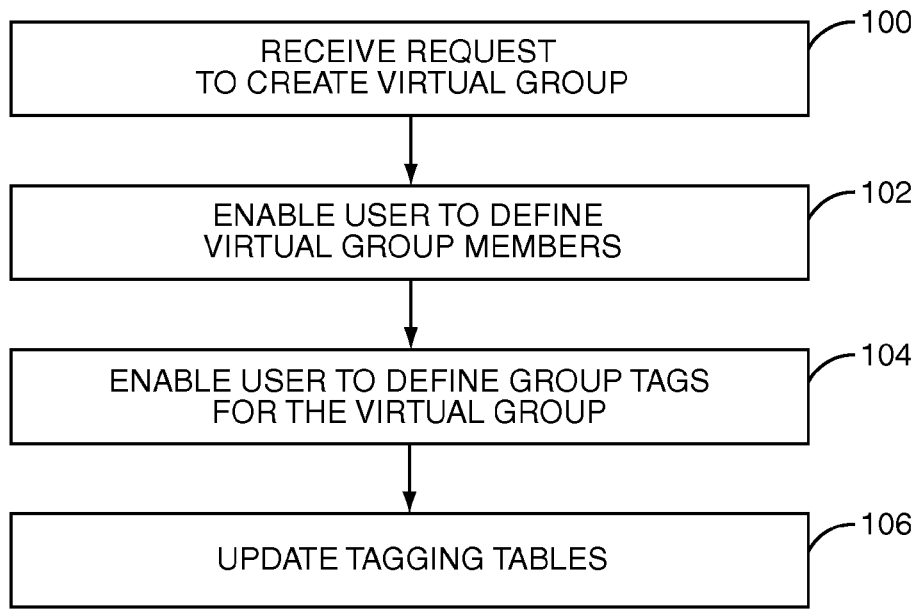
FIG. 3 illustrates the process of creating a virtual group and defining group tags for the virtual group according to one embodiment of the present invention.

FIG. 3 illustrates an exemplary process for creating a virtual group and defining group tags for the virtual group. First, the sharing function 20 receives a request to create a virtual group from one of the users 16-1 through 16-N (step 100). In this example, the request is from the user 16-1 via the client function 34-1 of the user device 14-1. The sharing function 20 then enables the user 16-1 to define the members of the virtual group (step 102). For example, the user 16-1 may enter usernames of ones of the other users 16-2 through 16-N that are to be members of the virtual group and/or group identifiers of other virtual groups that are to be members of the virtual group. In one embodiment, once the virtual group is defined, the entire uploaded image collections of the members of the virtual group are shared within the virtual group. However, note that the sharing function 20 may, for example, notify the ones of the other users 16-2 through 16-N that they have been selected for the virtual group. In response, the users may provide authorization to be added to the virtual group and optionally identify select images from their uploaded image collections to be shared with the virtual group. Similarly, the user 16-1 may optionally identify or select ones of the images from the uploaded image collection of the user 16-1 to be shared with the virtual group. Note that if the user 16-1 belongs to more than one virtual group, the user 16-1 may choose to share different images or albums with each of the virtual groups. As another example, the user 16-1 may enter email addresses of the other users, wherein the central server 12 then provides email invitations to join the virtual group to the other users.

The sharing function 20 may also enable the user 16-1 to define a list of group tags for the virtual group to be initially associated with the virtual group (step 104). Note that the user 16-1 and/or the other users in the virtual group may thereafter add, remove, and modify the group tags for the virtual group.

In addition or alternatively, the sharing function 20 may enable auto-generation of group tags for the virtual group by analyzing existing tags of the images shared within the virtual group. The existing tags may be traditional tags stored in headers of the images shared within the virtual group, group tags for other virtual groups to which the images shared within the virtual group belong, personal tags used to tag the images within the personal group, or any combination thereof. The sharing function 20 may analyze the existing tags to, for example, identify ones of the existing tags that have been used at least a threshold number of times. For example, if one of the existing tags has been used to tag two or more of the images shared within the virtual group, the sharing function 20 may identify that tag as a group tag for the virtual group. Note that the sharing function 20 may perform this process periodically or in response to some triggering event during the lifetime of the virtual group in order to identify or recommend group tags for the virtual group. Note that if, for example, a group tag for the "Andy's Family" virtual group (FIG. 2) is identified as a group tag for the "Smith Family" virtual group, the tag may be added to the list of group tags for the "Smith Family" virtual group and removed from the list of group tags for the "Andy's Family" virtual group.

At some point either during or after the completion of steps 100-106, the sharing function 20 updates the tagging tables 26-32 to store information defining the virtual group and the group tags for the virtual group (step 106). More specifically, entries for the group tags are added to the tags table 26 and a group entry for the virtual group is added to the group table 28.

Figure 4:
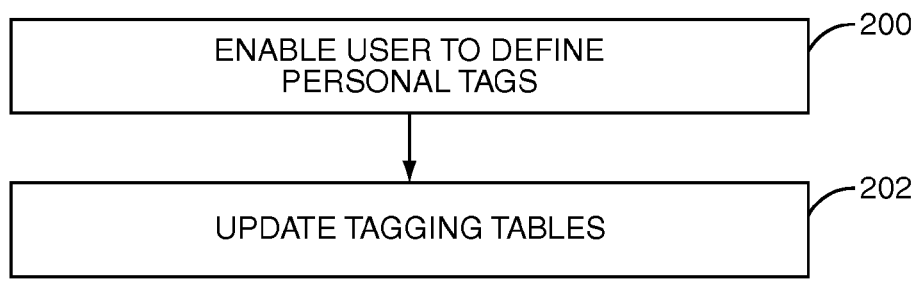
FIG. 4 illustrates the process of defining personal tags according to one embodiment of the present invention.

FIG. 4 illustrates a similar process for defining personal tags. First, the sharing function 20 enables, for example, the user 16-1 to define personal tags via the client function 34-1 (step 200). The sharing function 20 then updates the tagging tables to store the personal tags defined by the user 16-1 (step 202). More specifically, the sharing function 20 creates entries for the personal tags in the tags table 26 and either updates or creates an entry for the user 16-1 in the personal table 30.

Figure 5:
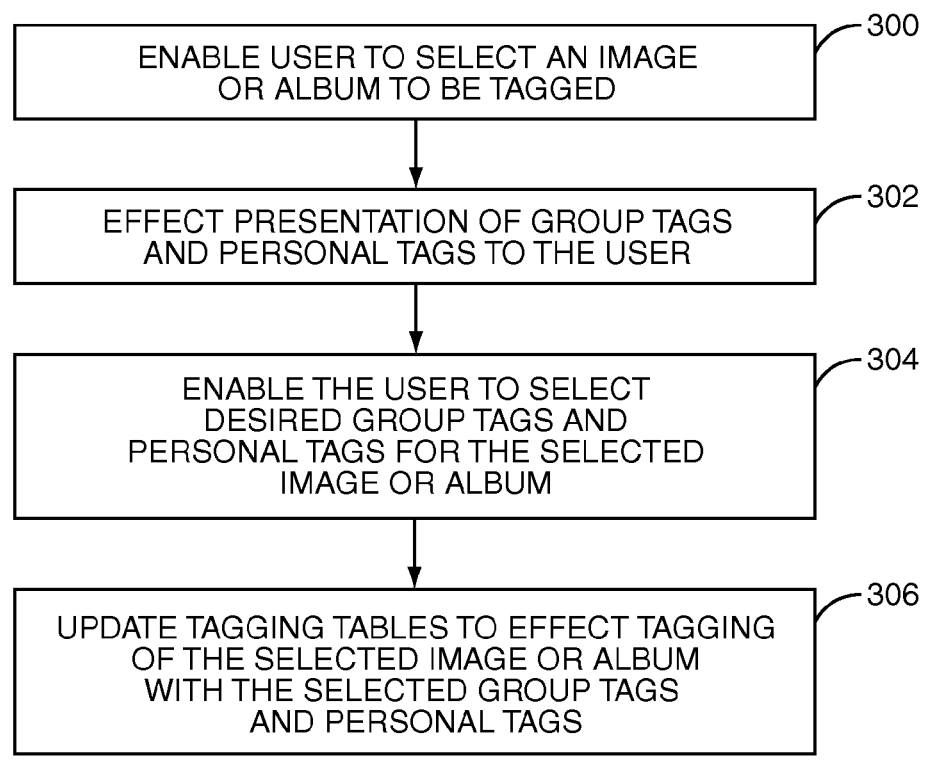
FIG. 5 illustrates the process of tagging a digital image or album with one or more group and personal tags according to one embodiment of the present invention.

FIG. 5 illustrates an exemplary process enabling a user to tag an image with group tags and personal tags according to one embodiment of the present invention. Again, the user 16-1 is used as an example. First, the sharing function 20 enables the user 16-1 to select an image or album to be tagged (step 300). More specifically, if the user 16-1 is a member of more than one virtual group, the sharing function 20 may enable the user 16-1 to select a desired virtual group. In response, the images and/or albums shared within the virtual group are presented to the user 16-1 via the client function 34-1 at the user device 14-1. The user 16-1 then selects a particular image or album shared within the virtual group for tagging. The selected image or album may be owned by the user 16-1 or owned by another member of the virtual group.

In order to enable tagging, the sharing function 20 effects presentation of the group tags for the virtual group and optionally the personal tags of the user 16-1 to the user 16-1 via the client function 34-1 at the user device 14-1 (step 302) and enables the user 16-1 to select one or more of the group tags, one or more of the personal tags, or both to be applied to the selected album or image (step 304). The user 16-1 may also be enabled to modify or remove group tags and/or personal tags applied to the selected image or album. In addition, the user 16-1 may be enabled to add group tags to the list of group tags for the virtual group, modify group tags in the list of group tags for the virtual group, remove group tags from the list of group tags for the virtual group, add personal tags to the list of personal tags for the user 16-1, modify personal tags in the list of personal tags for the user 16-1, or remove personal tags from the list of personal tags for the user 16-1 at this point. The sharing function 20 may also enable the user 16-1 to move a group tag from one virtual group to another. Still further, the sharing function 20 may also enable the user 16-1 to view group tags from a sister virtual group and, if desired, add a group tag from the virtual sister group as a group tag for the virtual group. For example, "Andy" (FIG. 2) may be able to view the group tags of the "Tom's Family" virtual group and potentially add one or more of those group tags as group tags for the "Andy's Family" virtual group. In response, the sharing function 20 may detect that the two sister virtual groups have the common group tag and move the common group tag to the list of group tags for the parent virtual group ("Smith Family" virtual group).

Once the desired group tags and optionally personal tags are selected by the user 16-1, the sharing function 20 updates the tagging tables 26-32 such that the selected image or the images within the selected album are tagged with the selected group and personal tags (step 306). Tagging occurs by associating the group and personal tags with the selected image or the images within the selected album. More specifically, the entry for the selected image or the entries for the images within the selected album in the content tagging table 32 may be updated to include references to or information otherwise identifying the selected group and personal tags. In addition, if the tags table 26 stores references to or information otherwise identifying the images that are tagged by each of the tags stored in the tags table 26, the sharing function 20 may also update the tags table 26.

Figure 6:
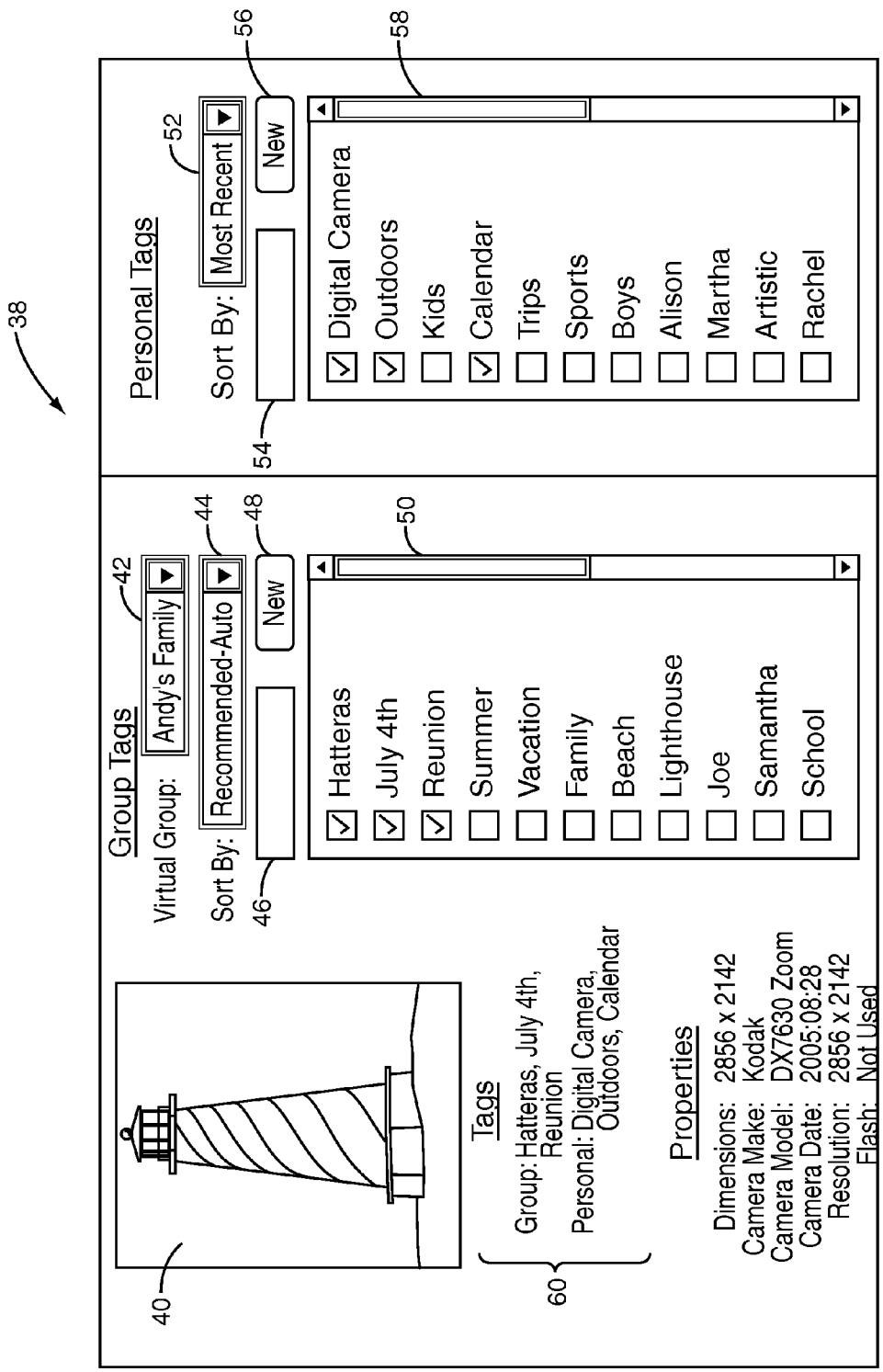
FIG. 6 illustrates an exemplary Graphical User Interface (GUI) for tagging a digital image or album with one or more group and personal tags according to one embodiment of the present invention.

FIG. 6 illustrates an exemplary Graphical User Interface (GUI) 38 that may be presented to, for example, the user 16-1 via the client function 34-1 to enable group and personal tagging according to the present invention. In general, as discussed above, the user 16-1 selects an image or album to be tagged. In this example, the user 16-1 has selected image 40. As such, the sharing function 20 effects presentation of the selected image 40, a screennail of the selected image 40, or a thumbnail of the selected image 40 to the user 16-1 via the GUI 38.

Looking at the group tags first, a pull-down menu 42 enables the user 16-1 to select a desired virtual group. In this example, the user 16-1 is "Andy" from FIG. 2, and the user 16-1 has selected the "Andy's Family" virtual group. A second pull-down menu 44 is optional and enables the user 16-1 to select a desired sorting algorithm to be used to sort the group tags for the selected virtual group before presentation to the user 16-1 via the GUI 38. For example, the group tags may be sorted alphabetically, sorted by creation date, sorted by date that the group tags were last used to tag an image or album, sorted such that group tags used to tag images in the same album or directory are listed first, or the like. In addition or alternatively, the group tags may be sorted such that recommended group tags for the selected image 40 are listed first. More specifically, the sharing function 20 may use image recognition algorithms such as facial recognition algorithms to identify persons in the selected image 40, image recognition algorithms to identify objects in the selected image 40, or the like. The sharing function 20 may then select ones of the group tags used to tag other images including the identified persons or objects as the recommended group tags. In a similar fashion, the sharing function 20 may additionally or alternatively recommend ones of the group tags based on location. A tag entry field 46 and associated "New" button 48 may be used by the user 16-1 to add a new group tag for the selected virtual group.

In operation, the client function 34-1 sends information identifying the selected virtual group and the selected sorting algorithm to the sharing function 20. In response, the sharing function 20 obtains the group tags for the selected virtual group, sorts the group tags based on the selected sorting algorithm, and provides the sorted list of group tags to the user device 14-1. In response, the client function 34-1 presents the sorted list of group tags to the user 16-1 in a group tag area 50 of the GUI 38. The user 16-1 may then select desired ones of the group tags by checking corresponding check boxes in the group tag area 50 of the GUI 38. The client function 34-1 returns the selected group tags to the sharing function 20, and the sharing function 20 then updates the tagging tables 26-32.

In a similar fashion, the GUI 38 includes a pull-down menu 52 to select a desired sorting algorithm for the personal tags of the user 16-1. The GUI 38 may also include a tag entry field 54 and associated "New" button 56 enabling the user 16-1 to add new personal tags. The client function 34-1 sends information identifying the selected sorting algorithm to the sharing function 20. In response, the sharing function 20 obtains the personal tags of the user 16-1 and sorts the personal tags using the selected sorting algorithm. The sharing function 20 then provides the sorted list of personal tags to the user device 14-1, and the client function 34-1 presents the sorted list of personal tags to the user 16-1 via a personal tag area 58 of the GUI 38. The user 16-1 may then select desired ones of the personal tags by checking corresponding check boxes in the personal tag area 58 of the GUI 38. The client function 34-1 returns the selected personal tags to the sharing function 20, and the sharing function 20 then updates the tagging tables 26-32.

The GUI 38 may also include a tag display area 60 near the selected image 40. The client function 20 may display the group tags and personal tags associated with the selected image 40 in the tag display area 60.

Figure 7:
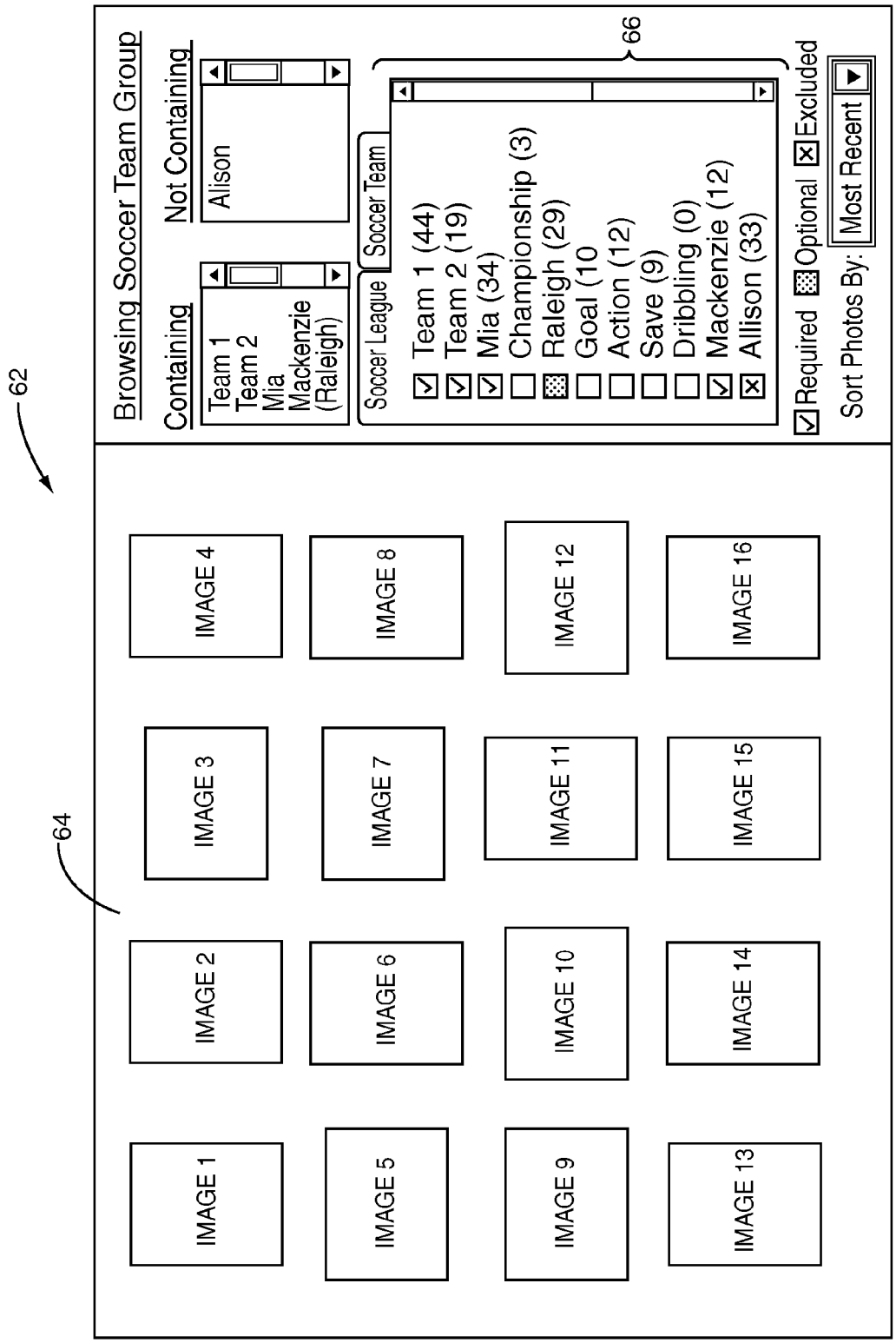
FIG. 7 illustrates an exemplary Graphical User Interface (GUI) for searching for images shared within a virtual group using group tags according to one embodiment of the present invention.

FIG. 7 illustrates an exemplary GUI 62 for browsing and searching images shared within a selected virtual group. Again, the user 16-1 is used as an example. In this illustration, the user 16-1 is the user "Andy" from FIG. 2 and has selected the "Soccer Team" virtual group for browsing. The GUI 62 includes an image display area 64 and tag selection area 66. The tag selection area 66 enables the user 16-1 to select required tags, optional tags, and excluded tags from a list of group tags for the selected virtual group ("Soccer Team"). Since the selected group is a child of a parent virtual group ("Soccer League"), the tag selection area 66 may also enable the user to select required tags, optional tags, and excluded tags from a list of group tags for the parent virtual group ("Soccer League"). Note that in this example, the user 16-1 may view the list of group tags for the selected virtual group ("Soccer Team") by selecting a corresponding "Soccer Team" tab or view the list of group tags for the associated parent group ("Soccer League") by selecting a corresponding "Soccer League" tab.

By selecting required group tags, optional group tags, and excluded group tags, the user 16-1 defines a search of the selected virtual group. Information identifying the required group tags, optional group tags, and the excluded group tags is provided to the sharing function 20 at the central server 12. In response, the sharing function 20 identifies ones of the images shared within the selected virtual group that are tagged with the required group tags, that may or may not be tagged with the optional group tags, and that are not tagged with the excluded group tags. The sharing function 20 then returns the identified images, or screennails or thumbnails thereof, to the client function 34-1 at the user device 14-1. The client function 34-1 then presents the identified images to the user 16-1 in the image display area 64 of the GUI 62. Thus, by using the GUI 62, the user 16-1 may search the images shared within a select virtual group based on the group tags of the virtual group. In a similar fashion, the user 16-1 may be enabled to sort the images in the selected virtual group and/or arrange the images in the selected virtual group into a number of albums based on the group tags.

Note that while the exemplary GUI 62 of FIG. 7 does not enable searching based on personal tags, the GUI 62 may easily be modified to search based on both group and personal tags or based only on personal tags as will be apparent to one of ordinary skill in the art upon reading this disclosure.

It should be further noted that while the sharing function 20 performs the search in the example given above, the present invention is not limited thereto. For example, the search may alternatively be performed by the client function 34-1 based on information provided to the client function 34-1 from the central server 12 such as a list of images and associated tags shared in the virtual group.

Figure 8:
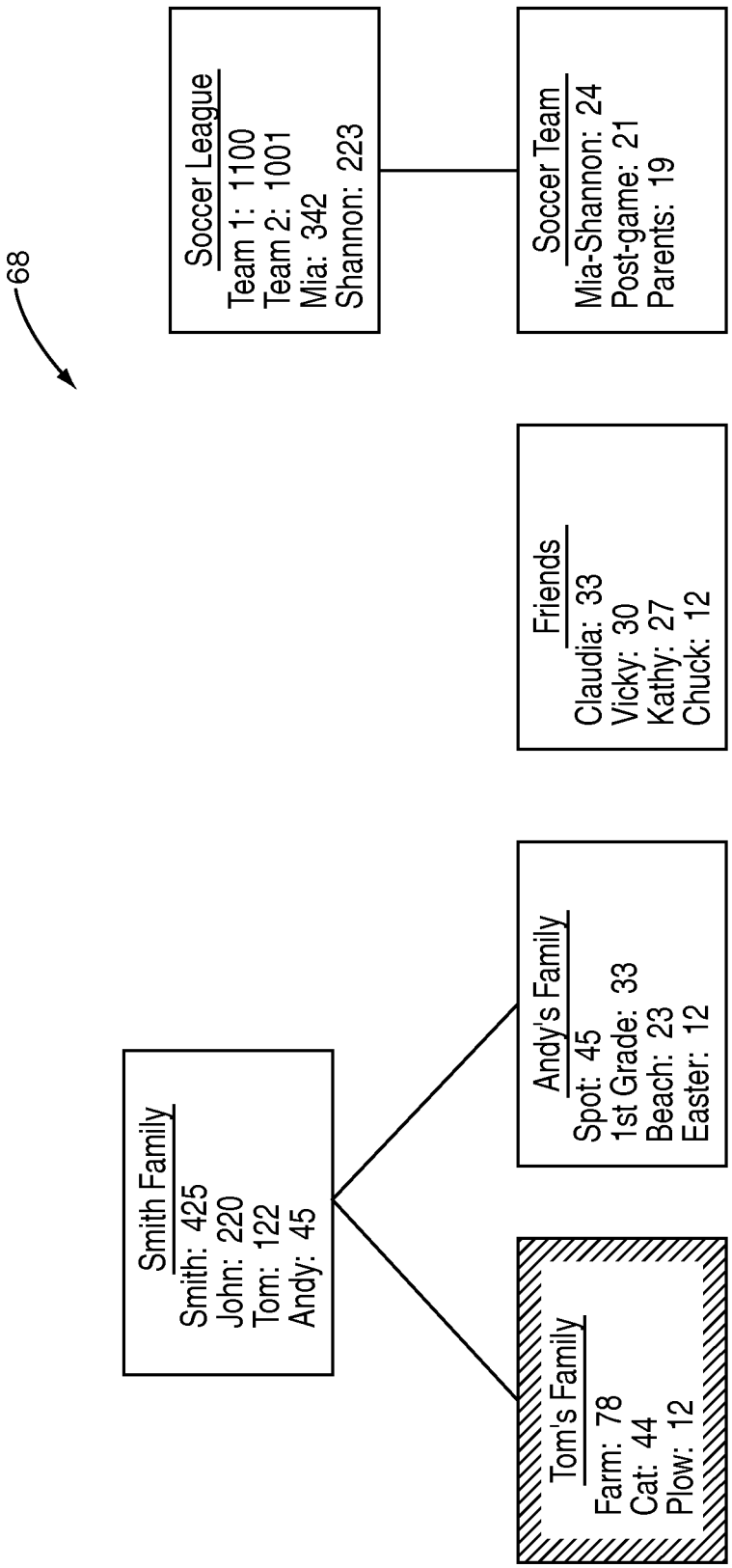
FIG. 8 illustrates an exemplary Graphical User Interface (GUI) for navigation of images shared within a virtual group using group tags according to another embodiment of the present invention.

FIG. 8 illustrates another GUI 68 that may be used to search images shared within virtual groups based on group tags. Again, the user 16-1 is used for this example, where the user 16-1 is the user "Andy" from FIG. 2. The user 16-1 is a member of the "Andy's Family" virtual group, which is a member of the "Smith Family" virtual group; the "Friends" virtual group; and the "Soccer Team" virtual group, which is a member of the "Soccer League" virtual group. In addition, the GUI 68 may optionally present the sister group "Tom's Family." For each virtual group, the GUI 68 presents a list all of the group tags or a list of the most popular group tags and a number of images shared within the virtual group that are tagged by those group tags. The GUI 68 enables the user 16-1 to select one or more of the group tags. In response, the client function 34-1 provides information identifying the selected group tags to the sharing function 20 of the central server 12. In response, the sharing function 20 provides the images tagged with the selected group tags, or screennails or thumbnails thereof, to the user device 14-1. The client function 34-1 may then present the images to the user 16-1.

Thus far, it has been assumed that group tags are accessible and visible to all of the users of the corresponding virtual group and that personal tags are accessible and visible to the associated user and optionally the owners of the images tagged with the personal tags. However, it may be desirable to enable the users 16-1 through 16-N to control access to and visibility of group tags and personal tags. As used herein, "access" to group or personal tags includes adding new tags to images or albums, modifying existing tags of images or albums, and removing tags from images or albums, whereas "visibility" refers to the ability of certain classes of users (owner, virtual group members, and guests) to see the group or personal tags applied to images or albums and use the group or personal tags for searching, sorting, and organizing the images and albums. For a specific image or album, the owner is the user owning the media collection including the image or album. Also, guests are persons that are not members of the virtual group that have been invited or otherwise have permission to view images and albums shared within the virtual group.

Accordingly, the sharing function 20 of the central server 12 may further enable the users 16-1 through 16-N to define access and visibility permission settings for group and personal tags. More specifically, referring first to access permission settings, the access permission settings for group tags may generally be defined as public, protected, or private. The public permission setting enables guests, virtual group members, and owners to add group tags to images or albums but enables only the virtual group members and the owners to modify or remove group tags from images or albums. The protected permission setting enables only the owners of the images or albums shared within the virtual group and the members of the virtual group to add group tags to images or albums, but only the owners of the images and albums and virtual group members having a defined password are enabled to modify or remove group tags from images or albums. The private permission setting enables only the owners of the images or albums to add, modify, and remove group tags of images or albums. It should be noted that the above permission settings for the group tags are exemplary and not intended to limit the scope of the present invention.

In a similar fashion, the access permission settings for personal tags may be defined as public, protected, or private. The public setting enables any member of the virtual group or the owner to add personal tags to images or albums shared within the virtual group, but enables only the owner to modify or remove personal tags from images or albums. The protected permission setting enables only the owner of an image or album and virtual group members with a defined password to add, modify, and remove personal tags from the image or album. The private permission setting enables only the owner of the image or album to add, modify, or remove personal tags for the image or album. It should be noted that the above permission settings for the personal tags are exemplary and not intended to limit the scope of the present invention.

Likewise, visibility permission settings for the group and personal tags may also be defined. In general, the visibility permission settings for group and personal tags may be public, protected, or private. The public permission setting enables anyone having permission to view the associated images or albums to see and use the group and personal tags, the protected setting enables only the owner and virtual group members to see and use the group and personal tags, and the private setting enables only the owner to see and use his or her tags. It should be noted that the above permission settings for visibility are exemplary and not intended to limit the scope of the present invention.

Figure 9:
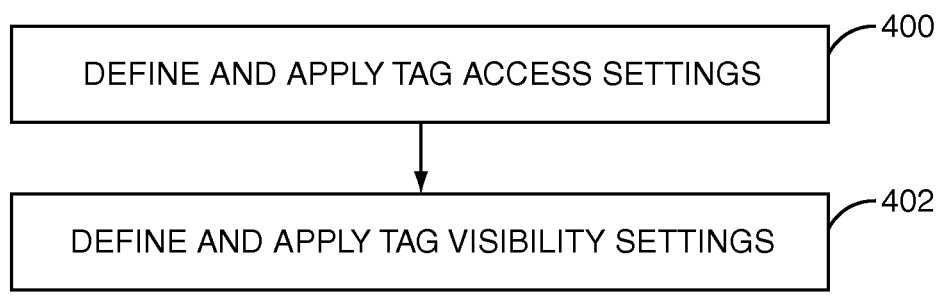
FIG. 9 illustrates a process for defining and applying access and visibility permission settings for group and personal tags according to one embodiment of the present invention.

FIG. 9 illustrates a process for defining access and visibility permission settings for group and personal tags according to one embodiment of the present invention. In general, access permission settings are defined and applied for both group and personal tags (step 400). More specifically, the access permission settings for the group and personal tags may be defined at the image level, at the album level, at the virtual group level, or any combination thereof. The access permission settings may be set at the image level and/or the album level at any point in time either before or after the image or album is shared within a virtual group. In one embodiment, access permission settings at the image level take precedence over access permission settings at the album level. The access permission settings may be defined at the group level by a user when the virtual group is created or automatically defined by the sharing function 20. In addition or alternatively, the group level access permission settings may be set at any time after creation of the virtual group. The access permission settings are preferably stored at the central server 12 and used by the sharing function 20 to control access to the group and personal tags.

As an example, the access permission settings for group tags may be applied as follows. Note that this discussion is equally applicable to personal tags. Looking at a particular virtual group, if the group level access permission setting for the group tags of the virtual group has been set by an associated user, the group level access permission setting may override or take precedence over any less restrictive image or album level access permissions for the group tags applied to images and albums within the virtual group, override or take precedence over all image and album level access permissions for the group applied to the images and albums in the virtual group, or be applied only to those images and albums that do not have access permission settings for the group tags defined at the image or album level. Thus, for example, if the group level access permission setting for the group tags is set to protected, the group level access permission setting may override any image level or album level access permission settings applied to images or albums shared within the virtual group that are set to public. Alternatively, the group level access permission setting may be applied to all images and albums shared within the virtual group thereby overriding any image level or group level access permission settings for the group tags applied to the images and albums shared within the virtual group. As yet another alternative, the group level access permission setting for the group tags may be applied only to those images or albums shared within the virtual group that do not have user defined image or album level access permission settings for the group tags.

If a group level access permission setting for the group tags has not been set by an associated user, the image and album level access permission settings of the images and albums shared within the virtual group may be used. A default access permission setting may be applied to images and albums shared within the virtual group that do not have image or album level access permission settings for the group tags. The default access permission setting for the group tags may be a defined setting such as private or may be set equal to a most restrictive image or album level access permission setting for the group tags among the images and albums shared within the virtual group.

Alternatively, if the group level access permission setting for the group tags has not been set by an associated user, the sharing function 20 may determine the most restrictive image or album level access permission setting for the group tags among the images and albums shared within the virtual group. The most restrictive image or album level access permission setting for the group tags may then be applied as the group level access permission setting for the virtual group. If none of the images or albums have image or album level access permission settings, a default setting such as private may be used. The group level access permission setting for the group tags may then override less restrictive image and album level access permission settings for the group tags or override all image and album level access permission settings for the group tags.

In a similar fashion, visibility permission settings are defined and applied for both group and personal tags (step 402). More specifically, the visibility permission settings for the group and personal tags may be defined at the image level, at the album level, at the virtual group level, or any combination thereof. The visibility permission settings may be set at the image level and/or the album level at any point in time either before or after the image or album is shared within a virtual group. In one embodiment, visibility permission settings at the image level take precedence over visibility permission settings at the album level. The visibility permission settings may be defined at the group level by a user when the virtual group is created or automatically defined by the sharing function 20. In addition or alternatively, the group level visibility permission settings may be set at any time after creation of the virtual group. The visibility permission settings are preferably stored at the central server 12 and used by the sharing function 20 to control visibility and use of the group and personal tags.

As an example, the visibility permission settings for group tags may be applied as follows. Note that this discussion is equally applicable to personal tags. Looking at a particular virtual group, if the group level visibility permission setting for the group tags of the virtual group has been set by an associated user, the group level visibility permission setting may override or take precedence over any less restrictive image or album level visibility permissions for the group tags applied to images and albums within the virtual group, override or take precedence over all image and album level visibility permissions for the group applied to the images and albums in the virtual group, or be applied only to those images and albums that do not have visibility permission settings for the group tags defined at the image or album level.

If a group level visibility permission setting for the group tags has not been set by an associated user, the image and album level visibility permission settings of the images and albums shared within the virtual group may be used. A default visibility permission setting may be applied to images and albums shared within the virtual group that do not have image or album level visibility permission settings for the group tags. The default visibility permission setting for the group tags may be a defined setting such as private or be set equal to a most restrictive image or album level visibility permission setting for the group tags among the images and albums shared within the virtual group.

Alternatively, if the group level visibility permission setting for the group tags has not been set by an associated user, the sharing function 20 may determine the most restrictive image or album level visibility permission setting for the group tags among the images and albums shared within the virtual group. The most restrictive image or album level visibility permission setting for the group tags may then be applied as the group level visibility permission setting for the virtual group. If none of the images or albums have image or album level access permission settings, a default setting such as private may be used. The group level visibility permission setting for the group tags may then override less restrictive image and album level visibility permission settings for the group tags or override all image and album level visibility permission settings for the group tags.

Figure 10:
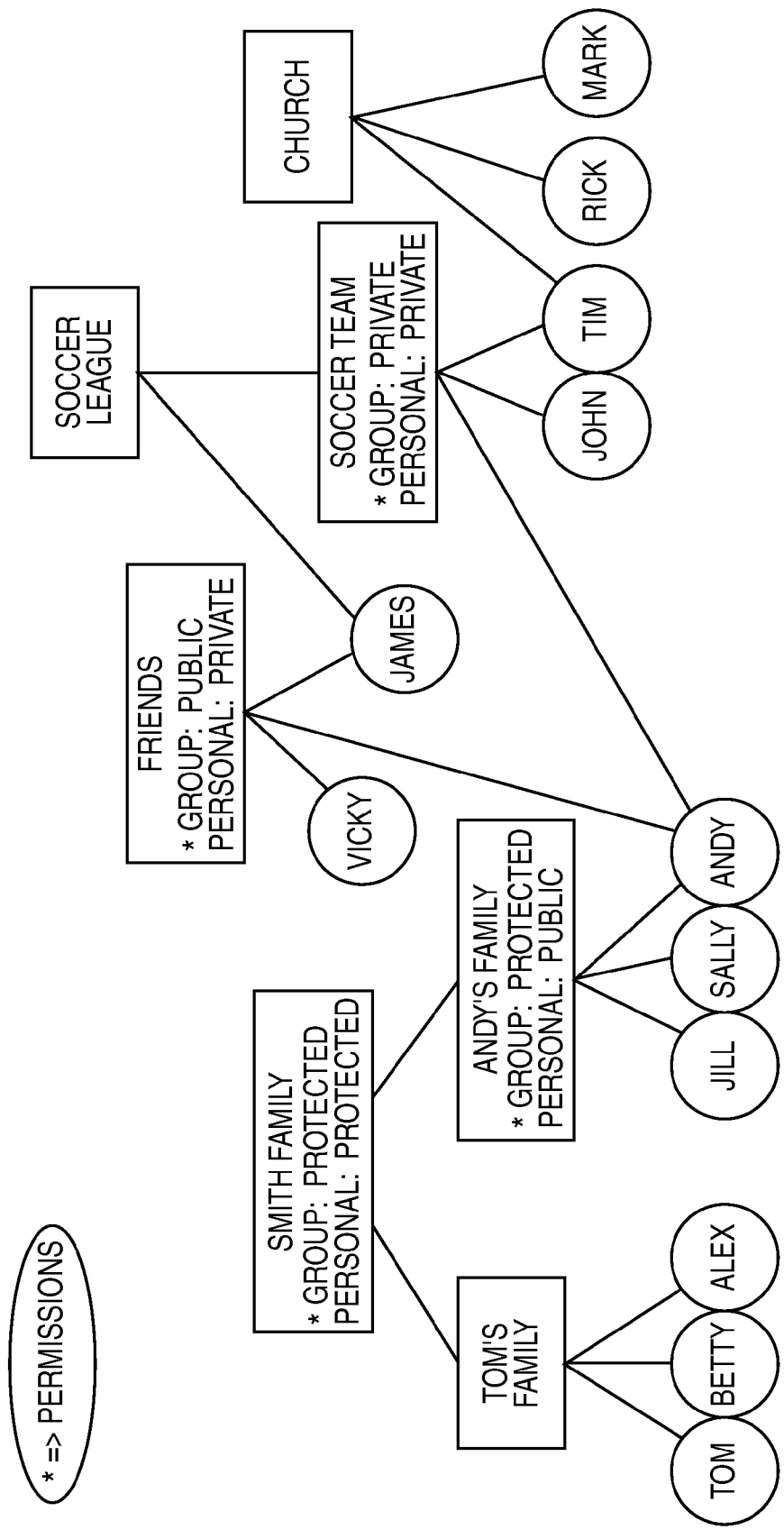
FIG. 10 is a diagram illustrating the concept of virtual groups and access permission settings according to one embodiment of the present invention.

FIG. 10 is similar to FIG. 2 but additionally illustrates group level access permission settings. As an example, for the "Smith Family" virtual group, the group level access permission setting for the group tags is protected, and the group level access permission setting for the personal tags is also protected. These group level access permission settings may override less restrictive access settings such as public for the group and personal tags applied to images and albums shared with the "Smith Family" virtual group by the associated users "Tom," "Betty," "Alex," "Jill," "Sally," and "Andy." For example, when "Andy" is operating in the "Smith Family" virtual group, "Andy" can add group tags to images or albums shared within the virtual group by the other users and, if he has the password, modify or remove group tags of images or albums shared within the virtual group. "Andy" may add personal tags to images and albums shared by the other users in the virtual group if he has the appropriate password.

In contrast, for the "Andy's Family" virtual group, the group level access permission setting for the group tags is set to protected, and the group level access permission setting for the personal tags is set to public. Thus, note that "Andy" and the other members of the "Andy's Family" virtual group have different access to personal tags depending the virtual group from which they are operating. When operating in the "Smith Family" virtual group, the access permission setting for the personal tags is protected. When operating in the "Andy's Family" virtual group, the access permission setting for the personal tags is public. As such, with respect to the albums and images shared by the members of the "Andy's Family" virtual group, the members have different access rights to the personal tags applied to the albums and images shared within the "Andy's Family" virtual group depending on whether they are operating as a member of the "Smith Family" virtual group or the "Andy's Family" virtual group.

FIG. 11 is a block diagram of an exemplary embodiment of the central server 12 of FIG. 1. In general, the central server 12 includes a control system 70 having associated memory 72. In this example, the sharing function 20 is implemented in software and stored in the memory 72. The central server 12 also includes one or more digital storage devices 74, which may be, for example, one or more hard disc drives, one or more optical storage devices, or the like. The user accounts database 22, content database 24, and tagging tables 26-32 may be stored in the digital storage devices 74. The central server 12 also includes a communication interface 76 communicatively coupling the central server 12 to the network 18 (FIG. 1). The central server 12 may also include a user interface 78, which may include, for example, a display, one or more user input devices, and the like.

FIG. 12 is a block diagram of an exemplary embodiment of the user device 14-1 of FIG. 1. This discussion is equally applicable to the other user devices 14-2 through 14-N. In general, the user device 14-1 includes a control system 80 having associated memory 82. In this example, the client function 34-1 is implemented in software and stored in the memory 82. The user device 14-1 also includes one or more digital storage devices 84, which may be, for example, one or more hard disc drives, one or more optical storage devices, or the like. The image collection 36-1 may be stored in the digital storage devices 84. The user device 14-1 also includes a communication interface 86 communicatively coupling the user device 14-1 to the network 18 (FIG. 1). The user device 14-1 may also include a user interface 88, which may include, for example, a display, one or more user input devices, and the like.

The present invention provides substantial opportunity for variation without departing from the spirit or scope of the present invention. For example, while only group and personal tags are discussed above, additional tag types may be defined. For example, within a particular group, a number of tag types may be defined. More specifically, the "Soccer Team" virtual group may include the group tags described above. In addition or alternatively, the "Soccer Team" virtual group may include tag types such as "Action" and "Players," where the "Action" tag type includes tags such as "dribbling" and "score" while the "Players" tag type includes the names of the players on the team. Access and visibility of these different tag types may be controlled jointly or separately.

As another example, while the discussion herein focuses on a centrally hosted sharing system, the present invention is not limited thereto. More specifically, the present invention is equally applicable to any type of digital media sharing system such as, for example, a P2P sharing system, a hybrid P2P system, or the like. In a P2P system, the functionality of the central server 12 with respect to management of group and personal tags and permissions may be performed by one or more peers in the P2P sharing system. In a hybrid P2P sharing system, an intermediary server or proxy server operates to effect communication between peers. The functionality of the central server 12 with respect to management of group and personal tags and permissions may be performed by the intermediary server and/or one or more of the peers.

Those skilled in the art will recognize improvements and modifications to the preferred embodiments of the present invention. All such improvements and modifications are considered within the scope of the concepts disclosed herein and the claims that follow.

What is claimed is:

1. A method comprising:
providing a virtual group comprising a plurality of users at a central server, the plurality of users having separate media collections and sharing select media files from the separate media collections with the virtual group to provide a plurality of media files shared within the virtual group;
defining a plurality of group tags for the virtual group at the central server; and
enabling the plurality of users to tag the plurality of media files shared within the virtual group with select ones of the plurality of group tags for the virtual group at the central server.

2. The method of claim 1 further comprising enabling the plurality of users to search the plurality of media files shared within the virtual group based on the plurality of group tags.

3. The method of claim 1 further comprising enabling the plurality of users to add additional group tags to the plurality of group tags for the virtual group.

4. The method of claim 1 further comprising enabling the plurality of users to modify the plurality of group tags for the virtual group.

5. The method of claim 1 further comprising enabling the plurality of users to remove group tags from the plurality of group tags for the virtual group.

6. The method of claim 1 wherein defining the plurality of group tags comprises enabling at least one of the plurality of users to define the plurality of group tags for the virtual group.

7. The method of claim 1 wherein defining the plurality of group tags comprises:
analyzing existing tags for the plurality of media files shared within the virtual group to identify common tags; and
providing the common tags as the plurality of group tags for the virtual group.

8. The method of claim 1 further comprising effecting the steps of providing the virtual group, defining the plurality of group tags for the virtual group, and enabling the plurality of users to tag the plurality of media files shared within the virtual group with select ones of the plurality of group tags for the virtual group at the central server.

9. The method of claim 8 wherein each of the plurality of users has a separate user account with the central server.

10. The method of claim 1 wherein the plurality of group tags provides a common tag vocabulary for the virtual group.

11. The method of claim 1 wherein providing the virtual group comprises mapping the plurality of users to the virtual group.

12. The method of claim 1 further comprising:
defining access permission settings for the plurality of group tags; and
applying the access permission settings to control access to the plurality of group tags by the plurality of users in the virtual group.

13. The method of claim 12 wherein applying the access permission settings comprises applying the access permission settings to control access to the plurality of group tags by the plurality of users in the virtual group and guests having access to the plurality of media files shared within the virtual group.

14. The method of claim 12 wherein defining the access permission settings comprises enabling one of the plurality of users to define a group level access permission setting for the virtual group.

15. The method of claim 12 wherein defining the access permission settings comprises enabling one of the plurality of users to define an access permission setting for at least one of the plurality of media files shared within the virtual group from the separate media collection of the one of the plurality of users, thereby providing an image level access permission setting for the group tags applied to the at least one of the plurality of media files.

16. The method of claim 12 wherein defining the access permission settings comprises enabling one of the plurality of users to define an access permission setting for an album from the separate media collection of the one of the plurality of users including at least one of the plurality of media files shared within the virtual group, thereby providing an album level access permission setting for the group tags applied to the album.

17. The method of claim 12 wherein:
defining the access permission setting comprises enabling the plurality of users to define at least one of a group consisting of: a group level access permission setting for the virtual group, album level access permission settings for at least one album including ones of the plurality of media files shared within the virtual group, and image level access permission settings for at least one of the plurality of images shared within the virtual group; and
applying the access permission settings comprises overriding the album level access permission settings and the image level access permission settings if the group level access permission setting is defined.

18. The method of claim 17 wherein overriding the album level access permission settings and the image level access permission settings comprises overriding ones of the album level access permission settings and the image level access permission settings that are less restrictive than the group level access permission setting.

19. The method of claim 17 wherein applying the access permission settings further comprises applying at least one of the album level access permission settings and the image level access permission settings to control access to the group tags if the group level access permission setting has not been defined.

20. The method of claim 17 wherein applying the access permission settings further comprises applying a most restrictive one of the album level access permission settings and the image level access permission settings to control access to the group tags if the group level access permission setting has not been defined.

21. The method of claim 1 further comprising:
defining visibility permission settings for the group tags; and
applying the visibility permission settings to control visibility of the group tags.

22. The method of claim 1 further comprising:
enabling one of the plurality of users to define a plurality of personal tags for the one of the plurality of users; and
enabling the one of the plurality of users to tag the plurality of media files shared within the virtual group with select ones of the plurality of personal tags for the one of the plurality of users.

23. The method of claim 22 further comprising:
defining access permission settings for the personal tags; and
applying the access permission settings to control access to the personal tags by the plurality of users in the virtual group.

24. The method of claim 22 further comprising:
defining visibility permission settings for the personal tags; and
applying the visibility permission settings to control visibility of the personal tags.

25. A central server in a media sharing system comprising:
a memory and a processor,
a communication interface communicatively coupling the central server to a plurality of user devices associated with a plurality of users having separate media collections; and
a control system associated with the communication interface and enabling creation of a virtual group comprising ones of the plurality of users, the ones of the plurality of users sharing select media files from the separate media collections with the virtual group to provide a plurality of media files shared within the virtual group;
defining a plurality of group tags for the virtual group; and
enabling the ones of the plurality of users to tag the plurality of media files shared within the virtual group with select ones of the plurality of group tags for the virtual group.

* * * * *